(12) United States Patent
McKesson, Jr. et al.

(10) Patent No.: US 6,290,835 B1
(45) Date of Patent: Sep. 18, 2001

(54) TREATMENT OF WASTE FROM PRINTED CIRCUIT BOARD PRODUCTION FOR RECOVERY OF TIN AND ENVIRONMENTALLY SAFE DISPOSAL

(75) Inventors: Douglas W. McKesson, Jr., Half Moon Bay; Rudolf P. Sedlak, Mountain View, both of CA (US)

(73) Assignee: RD Chemical Company, Mountain View, CA (US)

( * ) Notice: Subject to any disclaimer, the term of this patent is extended or adjusted under 35 U.S.C. 154(b) by 0 days.

(21) Appl. No.: 09/498,694

(22) Filed: Feb. 7, 2000

Related U.S. Application Data
(60) Provisional application No. 60/119,319, filed on Feb. 9, 2000.

(51) Int. Cl.[7] .............................. C25C 1/00; C25C 1/14; C25F 5/00
(52) U.S. Cl. .................... 205/560; 205/611; 205/614; 205/717
(58) Field of Search .................................. 205/611, 717, 205/719, 560, 704, 599, 614; 588/204

(56) References Cited

U.S. PATENT DOCUMENTS

| | | |
|---|---|---|
| 4,420,401 * | 12/1983 | Kretas et al. ................. 204/DIG. 13 |
| 4,687,545 | 8/1987 | Williams et al. . |
| 4,713,144 | 12/1987 | Schiller . |
| 4,720,332 * | 1/1988 | Coffey ................................. 205/720 |
| 4,732,649 | 3/1988 | Larson et al. . |
| 4,944,851 | 7/1990 | Cordani et al. . |
| 5,219,484 | 6/1993 | Krulik . |
| 5,244,539 | 9/1993 | McGrath et al. . |
| 5,500,126 | 3/1996 | Fries . |
| 5,505,872 | 4/1996 | Krulik et al. . |
| 5,512,201 | 4/1996 | Singh et al. . |
| 5,578,191 | 11/1996 | Robert . |

FOREIGN PATENT DOCUMENTS

| | | |
|---|---|---|
| 1594251 | 3/1977 | (GB) . |
| 1594253 | 3/1977 | (GB) . |
| 1537670 | 1/1979 | (GB) . |
| 121328 B1 | 2/1984 | (PL) . |
| 1108137 | 8/1984 | (SU) . |

* cited by examiner

*Primary Examiner*—Donald R. Valentine
(74) *Attorney, Agent, or Firm*—Bozicevic, Field and Francis LLP; Carol L. Francis

(57) ABSTRACT

The present invention provides methods and compositions for use in recovery of metal from waste solutions minimally comprising tin as a dispersed insoluble oxide and iron as ferric ion. In general, the invention involves increasing the pH of the waste solution using a strong alkali to solubilize the tin, and adding a complexing agent(s) for other metal ions in the solution, e.g., ferric ion, and/or cupric ion, and/or plumbous ion, so as to maintain the iron and other metal ions in a soluble state in the treated waste solution. The treated waste solution can then be used in an electroplating system to recover the tin and other metals. The electroplated, treated waste solution that is produced after tin recovery is environmentally safe, and, after pH adjustment, can generally be disposed of in most sanitary sewage systems.

17 Claims, No Drawings

TREATMENT OF WASTE FROM PRINTED CIRCUIT BOARD PRODUCTION FOR RECOVERY OF TIN AND ENVIRONMENTALLY SAFE DISPOSAL

This application claims benefit of Ser. No. 60/119,319, filed Feb. 7, 2000.

FIELD OF THE INVENTION

This invention relates generally to the fields of treatment of waste from printed circuit board production, both to accomplish recovery of metals in the waste and to make the waste finally disposed more environmentally safe.

BACKGROUND OF THE INVENTION

Most printed circuit boards (PCBs) manufactured through 1985 had electroplated tin/lead on the top of the circuitry. In these typical PCBs of the time, the PCB was composed of a copper conductor pattern on an insulating support, with the tin/lead solder applied onto the copper substrate, typically by electroplating. The tin/led solder film was typically on the order of 0.0003 to 0.0004 inches thick, which thickness might vary considerably over the board and from board to board. After the solder film was applied onto the copper, a thin film of copper-tin alloy, called by the industry and "intermetallic layer", forms between the copper and the solder, typically about 0.000002 to 0.000004 inches thick. This copper-tin alloy film increases in thickness with time. This tin/lead coating served at least two purposes: 1) to facilitate the manufacturing process by serving as an etch resist; and 2) to preserve the solderability of the PCB.

Later, as the dimensions of the circuitry became smaller, the tin/lead coating became problematic. During the process of attaching the component(s) the tin/lead coating melted, ran, and electrically shorted the circuitry. To address this problem, a new type of PCB was developed which involved stripping the electroplated tin/lead from the board, and applying a solder mask, hence the term solder-mask-over-bare-copper (SMOBC) board. While the SMOBC method of PCB manufacturing solved the problems posed by the tin/lead coating in PCB manufacturing, the approach created a different, and very serious, problem. First, the waste generated by the stripping process posed a significant health and environmental hazard, particularly due to the presence of lead. In response, most PCB manufacturers today use a metal coating that is essentially pure tin, rather than a tin/lead alloy. The pure tin solder also had the advantage that it allowed an even thinner metal layer, typically about 0.0002 inches thick.

Several different approaches to accomplishing stripping of the tin and tin/lead solders have been described. In general, most of these process involve a source of ferric ions in an amount sufficient to dissolve the tin-copper alloy created at the solder-board interface. The stripper solutions are also generally of a very acidic pH, due to the addition of, for example, nitric acid and/or sulfamic acid. Exemplary stripper solutions are described in U.S. Pat. Nos. 5,512,201; 5,244,539; 4,713,144; and 4,687,545.

Despite the developments to overcome the basic manufacturing problems, serious obstacles to cost-effective PCB production remain. First, the waste generated from stripping the tin/lead solder, and even the pure tin replacement, pose significant environmental and health hazards. As mentioned above, the strip waste from the tin/lead solder stripping process contains hazardous amounts of lead. Even the waste from stripping the pure tin solder must be treated as a hazardous waste, since the stripping inevitably results in removal of copper from the board when the solder covering it is stripped from the board. Thus, in general, the spent tin, or tin/lead, stripper typically contains about 150 to 200 gm/l of dissolved, or dispersed metal(s) (e.g., tin or tin/lead), with small amounts (about 100 to 2000 ppm (or about 0.01 to 2.0 gm/l)) of copper present in solution. The tin is present mostly as stannic oxide, the lead as plumbous nitrate, and the copper as cupric nitrate. Disposal of such wastes is extremely expensive, and effective, low cost methods for treating such waste to render it more environmentally safe are sorely lacking.

In addition to the costs associated with disposal of the spent stripper solution, disposing of spent stripper solution also represents potentially millions of dollars in lost opportunity costs. Specifically, the large amounts of tin in the spent stripper solution are very valuable, adding to the overall operation costs. For example, at this writing, the typical cost of a commercial proprietary tin or tin/lead stripper solution costs about $6 to $7 per gallon, the cost of disposal of the spent stripper solution is about $3 to $5 per gallon, and the value of the tin in the spent stripper solution, since the stripper capacity is typically about 1 to 1.5 lbs per gallon of tin, is about $3 to $5 gallon.

Despite the fact that these estimates of costs and lost value would seem sufficient to motivate tin recovery from spent stripper solutions, there are few cost-effective means for successfully removing the tin from these wastes. For example, one conventional approach for cleaning up the solution and recovering the metal values is a specialized form of electroplating called electrowinning. However, when simple electroplating/electrowinning technology is applied, because the tin is simply dispersed, and not in true solution, the tin simply does not plate out of the spent stripper solution effectively.

There is thus a need in the field for methods and compositions to recover tin from waste solutions in a cost-effective manner and that further provides an environmentally safer treated waste solution. The present invention addresses these problems.

SUMMARY OF THE INVENTION

The present invention provides methods and compositions for use in recovery of metal from waste solutions minimally comprising tin as a dispersed insoluble oxide and iron as ferric ion. In general, the invention involves increasing the pH of the waste solution using a strong alkali to solubilize the tin, and adding a complexing agent(s) for other metal ions in the solution, e.g., ferric ion, and/or cupric ion, and/or plumbous ion, so as to maintain the iron and other metal ions in a soluble state in the treated waste solution. The treated waste solution can then be used in an electroplating system to recover the tin and other metals. The electroplated, treated waste solution that is produced after tin recovery is environmentally safe, and after pH adjustment, can generally be disposed of in most sanitary sewage systems.

In one aspect the invention features a method of recovery of metal from a waste solution comprising tin and iron, where the method involves adding to a waste solution an amount of an alkali sufficient to solubilize tin in the waste solution and an amount of a ferric ion complexing agent sufficient to solubilize the ferric ion, said adding producing a treated waste solution; and subjecting the treated waste solution to electroplating to recover metal from the solution. In specific embodiments, the ferric ion complexing agent is gluconate. In further specific embodiments, the waste solution further comprises cupric ion or plumbous ion, and the adding step includes adding a cupric ion complexing agent or a plumbous ion complexing agent, respectively.

In another aspect the invention features a method of stripping an etch resist from a copper substrate, where the method involves the steps of: 1) contacting a stripper solution comprising ferric ion with a copper substrate comprising a tin layer so that the tin layer is removed from the copper substrate and a spent stripper solution is produced, and 2) combining the spent stripper solution with an amount of an alkali sufficient to solubilize tin in the waste solution and an amount of a ferric ion complexing agent sufficient to solubilize the ferric ion, thereby producing a treated spent stripper solution. In specific embodiments, the ferric ion complexing agent is gluconate, and/or the tin layer comprises lead.

In another embodiment, the invention features a method of rendering a waste solution comprising tin and iron environmentally safe, the method involving adding an amount of an alkali sufficient to solubilize tin in the waste solution and an amount of a ferric ion complexing agent sufficient to solubilize the ferric ion to produce a treated waste solution; and subjecting the treated waste solution to electroplating to recover metal from the solution. In specific embodiments, the waste solution further comprises plumbous ion and/or cupric ion, and the adding step further comprises adding an amount of a plumbous ion complexing agent and/or a cupric ion complexing agent sufficient to solublize the plumbous ion and/or cupric ion.

A primary object of the invention is to provide a cost-effective and efficient method for recovery of tin from a waste solution, particularly from a spent stripper solution.

Another object of the invention is to provide methods and compositions for the treatment of metal-containing waste solutions, particularly spent stripper solutions, so as to render the waste solution environmentally safe. For example, legal disposal in the United States is usually less than 1 ppm copper and less than 1 ppm lead.

Still another object of the invention is to provide an efficient method for removing metals from spent stripper solution, which method further provides for sequential removal of such metal ions in the order of copper, lead, and then tin. In a preferred embodiment, by the time the tin has been reduced to about 10% of its original value, the amount of copper and lead remaining in the treated spent stripper solution is negligible, e.g., the copper and lead are at environmentally acceptable levels.

Another advantage is that the method of the invention reduces the costs associated with disposing of spent stripper solution.

These and other objects, advantages and features of the present invention will become apparent to those skilled in the art upon reading this disclosure in combination with drawings wherein like numerals refer to like components throughout.

DETAILED DESCRIPTION OF THE PREFERRED EMBODIMENTS

Before the present methods and compositions for treatment of PCB manufacturing waste are described, it is to be understood that this invention is not limited to the particular embodiments described, as such methods, devices, and formulations may, of course, vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural referents unless the context clearly dictates otherwise. Thus, for example, reference to "a complexing agent" includes mixtures of different complexing agents, reference to "an alkali" includes mixtures of different such bases, and reference to "the method" includes reference to equivalent steps and methods known to those skilled in the art, and so forth.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the specific methods and/or materials in connection with which the publications are cited.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

By "waste solution" is meant any solution comprising tin as well as other metals (e.g., iron, copper, lead), and that is amenable to the environmental treatment and tin recovery methods described herein. An exemplary "waste solution" that is so amenable is a spent stripper solution. While spent stripper solutions are described as being of particular interest for treatment using the methods and compositions of the present invention, such spent stripper solutions are only exemplary of waste solutions that are amenable to treatment using the methods and compositions of the invention.

By "spent stripper solution" is meant any stripper solution that has been used in stripping a tin, tin/lead, or other tin alloy (e.g., used as a solder in PCB manufacturing as, for example, an etch resist or in the hot air leveling process) from a surface, e.g., from a copper surface during PCB manufacturing.

By "complexing agent" is meant a compound that coordinates (e.g., complexes) with a metal ion present in a solution in the form of a complex or a complex ion, and through such coordination renders the metal more soluble, typically more soluble by many orders of magnitude. "Complexing agent" as used herein is meant to encompass, but is not necessarily limited to, compounds recognized in the art as chelating agents. Chelating agents are multidentate ligands that attach to a central metal by more than one coordinating atom. The preferred complexing agent(s) will vary with the metal ion(s) to be complexed, as well as their oxidation/reduction state, in the waste solution (e.g., spent stripper solution). For example, where the metal ion to be complexed is ferric ion, the preferred complexing agent is the neutralized form of gluconic acid.

"Environmentally safe" as used herein generally refers to a treated waste solution that may have a metal ion content that is acceptable for disposal according to the relevant regulatory requirements.

Overview of the Invention

The present invention is based on the inventors' observation that the tin, iron, lead, and copper in spent stripper solution are not susceptible to recovery using conventional electroplating methods. The inventors have further observed that at least one major source of this problem lies in the fact that the tin is not truly in solution, but rather is present as a dispersed insoluble oxide, and thus is present in a state that is not available to react and undergo the electron exchange required for metal reduction (plating) to occur. Further, the inventors observed that while addition of a strong, soluble alkali converts stannic oxide in spent stripper solution to its soluble stannate salt (and thus rendering it amenable to recovery by electroplating). However, addition of the alkali also causes ferric ion in the solution to precipitate as ferric hydroxide. Unless the solution is diluted dramatically, (three fold dilution, or more) precipitation of ferric hydroxide causes the solution to gel.

The ferric hydroxide precipitation and gelling make recovery of the metals in the solution extremely difficult and slow, making metal recovery less desirable (e.g., less cost-effective). However, solubilization of the ferric ion, the most common iron ion present in the spent stripper solution, is not a simple matter. As is understood in the art, the more highly charged a metal ion (Ferrous=+2, Ferric=+3) the more difficult it is to complex. Further, as the basic strength of the metal hydroxide decreases, the more difficult the metal becomes to complex, and thus the more difficult the metal ion is to solublize. Ferric hydroxide is one of the most difficult to solublize metal salts known, for all these reasons, as it is so weak a base that the hydroxide begins to precipitate at a pH less than about 2.0. In contrast, ferrous hydroxide remains soluble up to about pH 7.

The inventors have found that addition of a suitable complexing agent for ferric ion, and optionally for other metals (other than tin) in the waste solution (e.g., cupric and plumbous), renders the metal soluble in the alkaline solution, thus facilitating faster, more efficient, and more thorough recovery of the tin from the treated solution, as well as removal of the ferric, plumbous, and/or cupric ions from the solution, rendering the treated solution environmentally safe. The inventors further found that heating of the solution during plating allowed for use of much higher current density (amperes per square foot of cathode area), thus further speeding the tin recovery process.

After the waste solution is treated using the compositions and methods described herein, and the metal values recovered, the pH of the solution can be suitably adjusted and disposed into most sanitary sewage systems, e.g., pouring the post-treatment solution down the drain.

The various aspects of the invention will now be described in further detail.

Treatment of Spent Stripper Solution

As described in the overview of the invention above, treatment of the spent stripper solution involves at least: 1) addition of an alkali to dissolve stannic oxide to its soluble stannate salt; and 2) addition of a complexing agent to render soluble other metals in the waste solution, particularly iron (normally present in the spent stripper solution as ferric), copper (normally present in the spent stripper solution as cupric), and/or lead (normally present in the spent stripper solution as plumbous). Each of these aspects will now be described in more detail.

Alkali

The alkali added to render the spent stripper solution sufficiently alkaline to dissolve stannic oxide to stannate may be any suitable alkali, preferably a strong, soluble alkali such as sodium hydroxide, potassium hydroxide, lithium hydroxide, various quaternary nitrogen hydroxides (e.g., tetramethyl ammonium hydroxide, choline hydroxide, etc.), and the like. In general, where the complexing agent is gluconate, a suitable alkali is one that can raise the pH to greater than about pH 12 or greater than about pH 13. The pH of the final treated waste solution (which comprises both the alkali and the complexing agent) is sufficient to solubilize the tin in the waste solution. Generally, the pH is greater than about pH 10, usually greater than about pH 11, more usually greater than about pH 13. In general, the treated waste solution should be above about pH 11.5 in order to solubilize stannate per the following reaction:

where the tin is present in the spent stripper as the insoluble stannic oxide, and MOH is a strong base, with M as a generic cation, which will give a soluble stannate salt.

Complexing agent

The complexing agent is selected so as to solubilize metal ions other than tin that may be present in the waste solution, and that may become insoluble upon addition of the alkali to the waste solution. For example, the complexing agent is selected so as to complex with the metal ions, preferably all metal ions, present in the spent stripper solution other than tin (e.g., iron ions (ferric ion), copper ions (cupric ion), and/or lead ion (plumbous ion)), while not complexing with the tin ions (stannate) present in the solution. In general, the complexing agent of choice complexes with positively charged metal ions, eg. $Fe^{+++}$, $Cu^{++}$, and $Pb^{++}$, but does not substantially complex with tin, Which is present largely as the stannate ion, which is negatively charged, $SnO_3^=$. Suitable exemplary complexing agents include, but are not necessarily limited to, gluconic acid (gluconate), sorbitol, and the like.

In general, the complexing agent is added to the waste solution in an amount effective to keep soluble the metals other than tin. Of especial interest is the addition of a complexing agent for iron, particularly for the ferric ion, which is present in many conventional stripper solutions (e.g., in the form of ferric nitrate). Preferred complexing agents having a pM for the metal ion to be complexed (e.g., ferric ion) that is suitable for use in the highly basic treated waste solution (e.g., is greater than about pH 10, usually greater than about pH 11, more usually greater than about pH 13, normally above about pH 11.5). Where the ferric ion is to be complexed (and thus maintained as soluble) upon alkanization of the waste solution during the course of the method of the invention, a preferred complexing agent is gluconic acid (gluconate).

The amount of complexing agent used can vary widely. The complexing agent is normally added to the waste solution in excess of that minimally required to solubilize the metal ion of interest, for example, from about 0.1 to about 10 molar excess, usually from about 2 to about 4 molar excess of that needed to complex the desired metal ion. The spent stripper solution can be treated with a combination of two or more suitable complexing agents.

The complexing agent selected is preferably one that will complex with, and thus render soluble, all metals in the spent stripper solution, which metals include cupric, plumbous, and ferric. These metals may be present in various amounts in the spent stripper solution (e.g., cupric may be at relatively low amounts relative to ferric, and plumbous may not be present at any detectable level (e.g., where the metal coating stripped from the board is pure tin, both cupric and ferric will generally be present in addition to stannate, but plumbous may not be present in any detectable amount).

Recovery of Tin and Other Metal Ions

Any suitable electroplating system or process can be used to recover the tin, and to remove other metal ions, from the treated solution. Preferably, the electroplating system is selected so as to provide for the most efficient plating possible. "Efficient plating" of the metals other than tin encompasses plating where the effectiveness of the following reaction is high:

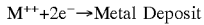
$$M^{++} + 2e^- \rightarrow \text{Metal Deposit}$$

(where M represents metal ion, such as cupric ion ($Cu^{++}$)).

The principle recovery of tin is from the stannate salt form, $Na_2SnO_3$. Thus efficient so the reaction for most of tin recovery is:

$$3H_2O + Na_2SnO_3 + 4e^- \rightarrow Sn(\text{metal}) + 2NaOH + 4OH^-$$

Preferably, the efficiency of the plating reaction is such at least about 50%, usually at least about 75%, more usually at least about 85% to about 90%, preferably at least about 95% to about 99% (w/w), up to substantially all (100%) of the metal ions (e.g., iron, lead, copper, and/or tin) in the waste solution is recovered (e.g., removed from the waste solution). In general, the amount of metal ions (e.g., iron, lead, copper, and/or tin) present in the waste solution is reduced to levels ranging from less than about 0.001% to about 5%, usually from about 0.01% to about 4%, more usually about 0.1% to about 3%, still more usually less than about 2.00% (where percentage is weight metal/weight solution). For example, where tin in the spent stripper solution is at about 150–200 grams/liter, the treated waste solution contains less than about 10 grams/liter tin. In general, the current density required for plating ranges from about 3 to about 15 ASF.

Plating speed and/or efficiency can also be improved by heating the treated waste solution during electroplating. Where heating is desirable, the temperature can vary, but will usually be heated to about 150° F. to about 210° F., and typically from 160–175° F.

The waste solution can be treated in its entirety in the vessel in which it was originally used (e.g., in the vessel in which the stripping process was carried out), or all or a portion of the waste solution can be treated in a separate vessel. This separate vessel can comprise the electrode system for electroplating, e.g., having prearranged anode and cathode elements. Where it is desirable to isolate the anode and/or cathode from the waste solution, the vessel further comprises a prearranged means for isolating the anode and/or cathode from the waste solution, the solution being fed to the appropriate compartment defined by the isolation means. Still further, the process can be operated as either a batch or continuous process.

The anode element of the electroplating system can be composed of any of the conventionally employed anode materials, such as carbon, stainless steel, platinized titanium, rare metal (e.g., ruthenium, iridium) oxide coated titanium, and the like, with stainless steel being a preferred anode element. The cathode element also is composed of conventional materials upon which metallic forms of the dissolved metal species in the waste solution can be plated (and most preferably in a form which is commercially saleable or of other economic value), such as copper, stainless steel, tin or the like, preferably stainless steel. The anode and cathode are connected by appropriate cables to the positive and negative terminals, respectively, of an appropriate rectifier, and a potential applied to produce a current density of from about 5 to 15 ASF (amps/sq. foot), more preferably from about 5 to about 10 ASF, based on the cathode surface area. In a further embodiment, electroplating can be carried out in a multiple cell electroplating system. Since plating cell electrode design tends to have either high metal loading capacity (e.g., large flat plates) or high surface area (giving higher current efficiency, which is important when the metal loading in the system drops), and further since low metal loading in the spent stripper implies lowered allowable current density, it may be desirable to use multiple plating cells during recovery of metals in the solution. For example, the first cells being of high metal loading capacity, and the secondary ones being of high cathode surface area (and thus higher plating speed) for doing a final clean up of the system, e.g., just prior to disposal.

It should be noted that while spent stripper solutions are of particular interest for treatment using the methods and compositions of the invention, other waste solutions that comprise tin and other metals are also amenable to such treatment. In general, waste solutions amenable that can be treated according to the method of the invention (e.g., to remove metal ions such as ferric, cupric, and/or plumbous ion, and to recover tin) are those solutions having tin as a dispersed insoluble oxide, particularly those solutions that further comprise ferric ion, and/or plumbous ion, and/or cupric ion. Furthermore, spent stripper solutions amenable to treatment according to the methods of the invention can range in the relative amounts of metal ions. For example, spent stripper solutions in the U.S. and other areas where the industry has moved to use of a pure tin coating as an etch resist rather than a tin/lead coating, the spent stripper can comprise about 150 g/l to about 200 g/l tin, as well as about 1 g/l to about 2 g/l copper. In contrast, in other countries where tin/lead is still used as an etch resist, the spent stripper solution can contain about 100 g/l to about 125 g/l tin, about 50 g/l to about 75 g/l lead, and about 1 g/l to about 2 g/l copper.

Incorporation of the Invention into the PCB Manufacturing Process

In one embodiment, the methods and compositions of the invention can be incorporated into the PCB manufacturing process. In general, the tin recovery and waste treatment methods of the invention can be used in conjunction with any PCB manufacturing process that involves removal of a tin or tin alloy coating (e.g., a tin or tin/lead solder).

PCB manufacturing normally involves use of copper-clad epoxy glass as the raw material of the substrate or board. Production of the circuitry on the PCB can proceed by either subtractive processing or additive processing. In subtractive processing, the more common of the two approaches, the circuitry is formed on the board by selectively removing copper from the substrate surface (subtractive processing). In additive processing, the circuitry is formed by selective deposition of conductive material on the substrate.

Subtractive processing-based production of PCBs can be used to produce double-sided boards, single-sided boards, or multilayer boards. Double sided boards are generally produced using sized (preferably pre-sized) laminate of copper-epoxy glass-copper. The laminate panels are stacked and pinned to facilitate drilling. The stacked panels normally include an entry material on top of the stack to facilitate drilling, as well as a backup board on the bottom of the stack. The entry material is normally made from phenolic, aluminum foil, or paper and ranges in thickness from about 0.0005 inches to 0.010 inches. The backup board is normally composed of phenolic, paper composite, or aluminum foil-clad fiber composite. The stacked laminate is then drilled and, if necessary, deburred.

After drilling, the panels are unstacked and processed through a series of chemical baths to remove organic contaminants and to clean the copper substrate. The chemical baths can also serve to sensitive the epoxy glass on the walls of the drilled holes to that it can receive a thin coating of copper, normally by electroless copper plating. The copper layer produced by the electroless copper plating step may not be sufficient to carry the electrical load necessary for the final board, but it can instead provide a metalized base upon which additional copper can be electrolytically deposited.

A circuitry pattern is then transferred to the board by a process referred to as imaging, which can be accomplished using a variety of different processes known in the art. In general, regardless of the specific method used, the end result of the imaging process is about the same in that a resist is used to cover the copper on the board surface except for those areas where copper is to remain as the final base material for the circuitry. The resist protects selected areas from further chemical processing (e.g., to "resist" the action of the chemicals). The most common processes for applying resist are dry film, screen print, and liquid, each of which are well known in the art.

The resist-treated boards are then subjected to pattern plating. The boards are first treated in one or more chemical baths to clean the copper pattern that is defined by resist. Copper is then electrolytically plated onto the exposed, cleaned copper to provide an additional layer of copper (usually about 0.001 inches thick) on the circuitry on the board surface on in the drilled holes. The circuitry pattern is further electroplated with solder, usually pure tin or a tin/lead alloy. The solder serves to protect the circuitry in subsequent processing steps, e.g., the solder serves as an "etch resist" to protect the underlying copper during the resist stripping and etching processes described below.

The resist is then stripped from the boards using conventional method known in the art, and the board exposed to a chemical etchant that removes the uncovered copper without substantially affecting the solder, thus leaving the copper that defines the ultimate circuitry in place. After the unwanted copper is removed from the board, the solder is then stripped from the board surface. It is at this point that the methods and the compositions of the invention can be incorporated into the PCB manufacturing process to recover tin from the waste solution containing the stripped solder and to render such waste suitable for disposal.

The double-sided PCB manufacturing process is completed by applying solder to selected uncoated areas to facilitate component attachment, and plating gold or nickel and gold to contact areas that are to ultimately be mated with a connector or other interconnecting device. Single-sided boards are processed in a manner similar to double-sided boards, except that the starting raw material is clad only on one side with copper, and the electroless copper plating step is omitted.

Multilayer boards, which represent the majority of boards manufactured in the U.S., are produced using processing steps similar to those described for double-sided boards described above. In general, a copper-clad epoxy glass substrate panels are cleaned to remove contaminants from the copper surface, the layers are imaged (etch resist applied), etched, and the etch resist stripped as described above for double-sided boards. After the etch resist is stripped, the copper circuitry on panels that are to become innerlayers are treated to improve adhesion to the epoxy-glass bonding agents, and to improve the structural strength and overall board reliability. The treated panels are then used in to produce a multilayer package composed of layers of the treated panels, prepreg (usually partially cured epoxy glass), and foils. The panel layups are stacked and laminated to provide a multilayer board, and the multilayer board baked.

The multilayer board can then be drilled, deburred (if necessary), and the inside surfaces of the holes subjected to electroless copper plating. A plating resist is then applied to the multilayer board to define the desired circuitry, and copper electroplated onto the remaining exposed copper on the surface and in the drilled, copper-coated holes. A tin or tin/lead solder is then applied to the exposed, electroplated copper to act as an etch resist, and the plating resist is stripped from the board. After the unwanted copper is removed by etching, the tin or tin/lead solder is removed by stripping, leaving behind a board having the desired copper circuitry on its surface. It is at this point, during and/or following this last solder stripping step, that the methods and compositions of the invention can be incorporated into the PCB manufacturing process to recover tin from the stripper waste solution. Multi-layer board production is completed as described above for double-sided boards.

EXAMPLES

The following examples are put forth so as to provide those of ordinary skill in the art with a complete disclosure and description of methods and compositions of the present invention, and are not intended to limit the scope of what the inventors regard as their invention nor are they intended to represent or imply that the embodiments described below are all on the only embodiments constructed or tested. Efforts have been made to ensure accuracy with respect to numbers used (e.g., amounts, concentrations, particular components, etc.), but some deviations should be accounted for.

Example 1

About 58.6 g of 67% tin/33% lead solder were stripped from various PCBs in 426 g of a solution composed of:

22.780% Nitric acid ($HNO_3$)
8.635% Ferric nitrate ($Fe(NO_3)_3$
68.585% Water

When stripping was completed, the resulting solution had a white milky stannic oxide dispersed precipitate, and the pH was less than 1.0.

The spent solution stripper was then combined with 297.1 g of 50% gluconic acid solution and 417.7 g of 50% potassium hydroxide solution. The resulting treated solution was a completely clear, brown-colored solution, with a pH greater than 13.0. Total solution weight at this point was 1195 g, with a dissolved metal content of 4.9% (w/w).

A pair of stainless steel electrodes were immersed in the above solution, and connected to a direct current rectifier. The solution was heated to 180° F., the power on the rectifier turned on, and the solution electroplated. At the beginning of the plating cycle, the solution was composed of 3.5% (w/w) tin and 1.98% (w/w) lead. After electroplating at a current flow of 0.250 amperes for a total of 44.0 hrs, the cathode was weighed and found to have plated on it a deposit of metals weighing 11.002 g. The plated, treated solution was composed of 3.28% (w/w) tin and 0.64% (w/w) lead. This example demonstrates that lead is removed from the spent stripper solution prior to the removal of tin.

Example 2

About 45.8 g of tin was stripped from the pure tin coatings of various printed circuit boards in 434.2 g of a solution composed of the following:

22.780% Nitric acid ($HNO_3$)
8.635% Ferric nitrate ($Fe(NO_3)_3$)
68.585% Water At completion of stripping, the resulting spent stripping solution had a white milky precipitate, with a pH less than 1.0.

705.5 g of 50% potassium hydroxide solution and 183.8 g of 50% gluconic acid solution were added to the spent stripping solution above. The resulting treated solution was a clear, amber colored solution, with a pH greater than 13.0. Total solution weight was 1369.3 g. At the beginning of the plating cycle, the solution contained 3.6% (w/w) tin. The treated solution was then electroplated at a current flow of 0.50 amperes. The amount of metal deposited on the cathode and the amount of tin remaining in the treated waste solution over time are summarized in the table below.

| Time | Metal Deposited on Cathode | Tin Remaining in Treated Waste Solution (w/w) |
| --- | --- | --- |
| 44.0 hrs | 4.1 g | 2.95% |
| 360.5 hrs | 20.2 g | 2.095% |
| 411 hrs | 22.1 g | 1.69% |

These data demonstrate that the method of the invention can be used to effectively recover tin from the spent stripper solution.

The invention as shown and described is considered to be the one of the most practical and preferred embodiments. It is recognized, however, that the departures may be made therefrom which are within the scope of the invention and that obvious modifications will occur to one skilled in the art upon reading this disclosure.

What is claimed is:

1. A method of recovery of metal from a waste solution comprising tin and iron, the method comprising the steps of:
    adding to a waste solution an amount of an alkali sufficient to solubilize tin in the waste solution and an amount of a ferric ion complexing agent sufficient to solubilize a ferric ion, said adding producing a treated waste solution; and
    subjecting the treated waste solution to electroplating to recover metal from the solution.

2. The method of claim 1, wherein the ferric ion complexing agent is gluconate.

3. The method of claim 1, wherein the ferric ion complexing agent is present in an amount of about 1:1 to about 10:1 molar excess of ferric ion in the treated waste solution.

4. The method of claim 1, wherein the alkali is added to adjust the pH solution to at least about pH 11.

5. The method of claim 1, wherein the waste solution is spent stripper solution.

6. The method of claim 1, wherein the waste solution further comprises plumbous ion and said adding step further comprises adding an amount of a plumbous ion complexing agent sufficient to solublize the plumbous ion.

7. The method of claim 1, wherein the waste solution further comprises cupric ion and said adding step further comprises adding an amount of a cupric ion complexing agent sufficient to solublize the cupric ion.

8. A method of stripping an etch resist from a copper substrate, the method comprising the steps of:
    contacting a stripper solution with a copper substrate comprising an etch resist, wherein the etch resist comprises tin and wherein the stripper solution comprises ferric ion, said contacting resulting in removal of the etch resist from the copper substrate and the production of spent stripper solution; and
    combining the spent stripper solution with an amount of an alkali sufficient to solubilize tin in the spent stripper solution and an amount of a ferric ion complexing agent sufficient to solubilize the ferric ion, said combining producing a treated spent stripper solution.

9. The method of claim 8, wherein the ferric ion complexing agent is gluconate.

10. The method of claim 8, wherein alkali is added to adjust the pH of the spent stripper solution to at least about pH 11.

11. The method of claim 8, wherein the etch resist further comprises lead.

12. A method of rendering environmentally safe a waste solution comprising tin and iron, the method comprising the steps of:
    adding to a waste solution comprising tin and ferric ion an amount of an alkali sufficient to solubilize tin in the waste solution and an amount of a ferric ion complexing agent sufficient to solubilize the ferric ion, said adding producing a treated waste solution; and
    subjecting the treated waste solution to electroplating to recover tin from the solution.

13. The method of claim 12, wherein the waste solution further comprises plumbous ion and said adding step further comprises adding an amount of a plumbous ion complexing agent sufficient to solublize the plumbous ion.

14. The method of claim 12, wherein the waste solution further comprises cupric ion and said adding step further comprises adding an amount of a cupric ion complexing agent sufficient to solublize the cupric ion.

15. The method of claim 12, wherein the tin is present in the solution in the form of a stannate ion.

16. The method of claim 12, wherein the waste solution further comprises cupric ion and plumbous ion, and said adding step further comprises adding an amount of a cupric ion complexing agent sufficient to solublize the cupric ion and an amount of a plumbous ion complexing agent sufficient to solublize the plumbous ion.

17. The method of claim 16, wherein the ferric ion complexing agent, the cupric ion complexing agent, and the plumbous ion complexing agent is gluconate.

* * * * *